United States Patent
Oberman et al.

(10) Patent No.: US 7,484,076 B1
(45) Date of Patent: Jan. 27, 2009

(54) EXECUTING AN SIMD INSTRUCTION REQUIRING P OPERATIONS ON AN EXECUTION UNIT THAT PERFORMS Q OPERATIONS AT A TIME (Q<P)

(75) Inventors: Stuart F. Oberman, Sunnyvale, CA (US); Ming Y. Siu, Santa Clara, CA (US); Sameer D. Halepete, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 171 days.

(21) Appl. No.: 11/532,853

(22) Filed: Sep. 18, 2006

(51) Int. Cl.
 *G06F 15/80* (2006.01)
(52) U.S. Cl. .......................... 712/203; 712/22
(58) Field of Classification Search ................. 712/203, 712/14, 22
 See application file for complete search history.

(56) References Cited

U.S. PATENT DOCUMENTS

2007/0130447 A1* 6/2007 Coon et al. ................. 715/215

* cited by examiner

*Primary Examiner*—Richard Ellis
(74) *Attorney, Agent, or Firm*—Townsend and Townsend and Crew LLP

(57) ABSTRACT

Methods, apparatuses, and systems are presented for performing instructions using multiple execution units in a graphics processing unit involving issuing an instruction for P executions of the instruction wherein each execution uses different data, P being a positive integer, the instruction being issued based on a first clock having a first clock rate, operating Q execution units to achieve the P executions of the instruction, Q being a positive integer less than P and greater than one, each of the execution units being operated based on a second clock having a second clock rate higher than the first clock rate of the first clock, and wherein the second clock rate of the second clock is equal to the first clock rate of the first clock multiplied by the ratio P/Q.

19 Claims, 7 Drawing Sheets

EXECUTING AN SIMD INSTRUCTION REQUIRING P OPERATIONS ON AN EXECUTION UNIT THAT PERFORMS Q OPERATIONS AT A TIME (Q<P)

BACKGROUND OF THE INVENTION

Advances in graphics processing techniques have lead to the use of more parallel computational resources for performing graphics related operations. This includes the adaptation of single instruction multiple data (SIMD) architectures to allow a single instruction to be carried out using multiple sets of data to produce multiple results. While providing parallel computational resources achieves greater speed by allowing numerous operations to be performed simultaneously, significant costs can be associated with building devices with high numbers of duplicate execution units. This is especially true in the case of sophisticated processing devices employing a large number of execution units that operate in parallel, wherein each execution unit is a highly capable component having complex circuitry and thus occupying a substantial amount of semiconductor area.

As designs for processing devices become more sophisticated, there is an ever increasing demand for more operations to be executed per unit time, as well as more capable execution units that can perform more complicated operations. In the effort to satisfy these demands, processing devices tend to be designed with ever higher numbers of parallel execution units that each contain significant circuitry. This leads to extremely large processing devices.

Even though semiconductor processing technology continues to improve to reduce circuit sizes and costs of manufacturing, such improvements occur at a relatively slow pace and may even be leveling off as advancements in processing technology approach the physical limits of materials used. Meanwhile the demand for faster, more capable devices that handle graphics related operations continues to grow. Thus, there is a significant need for techniques that allow a high number of operations to be performed while balancing the cost of semiconductor area consumption by parallel execution units.

BRIEF SUMMARY OF THE INVENTION

The present invention relates to methods, apparatuses, and systems for performing instructions using multiple execution units in a graphics processing unit involving issuing an instruction for P executions of the instruction wherein each execution uses different data, P being a positive integer, the instruction being issued based on a first clock having a first clock rate, operating Q execution units to achieve the P executions of the instruction, Q being a positive integer less than P and greater than one, each of the execution units being operated based on a second clock having a second clock rate higher than the first clock rate of the first clock, and wherein the second clock rate of the second clock is equal to the first clock rate of the first clock multiplied by the ratio P/Q.

At least one of the execution units may comprise pipeline stages. According to one embodiment, in one cycle of the first clock, the at least one execution unit loads input data for a first one of the P executions into the pipeline stages followed by input data for a second one of the P executions. According to one embodiment, in one cycle of the first clock, the at least one execution unit produces output data for a first one of the P executions from the pipeline stages followed by output data for a second one of the P executions.

In one embodiment of the invention, the ratio of P/Q is equal to 2. Input data for a first execution of the instruction may be received by one of the Q processing engines in one cycle of the second clock, and input data for a second execution of the instruction may be received by the same one of the Q processing engines in a consecutive cycle of the second clock. Output data for a first execution of the instruction may be produced by one of the Q processing engines in one cycle of the second clock, and output data for a second execution of the instruction may be produced by the same one of the Q processing engines in a consecutive cycle of the second clock.

The output data for the first execution of the instruction may be temporarily stored in a register while awaiting the output data for the second execution of the instruction. The output data for the first execution of the instruction and the output data for the second execution of the instruction may be written to a register in a register file in one cycle of the first clock.

DETAILED DESCRIPTION OF THE INVENTION

Figure 1:
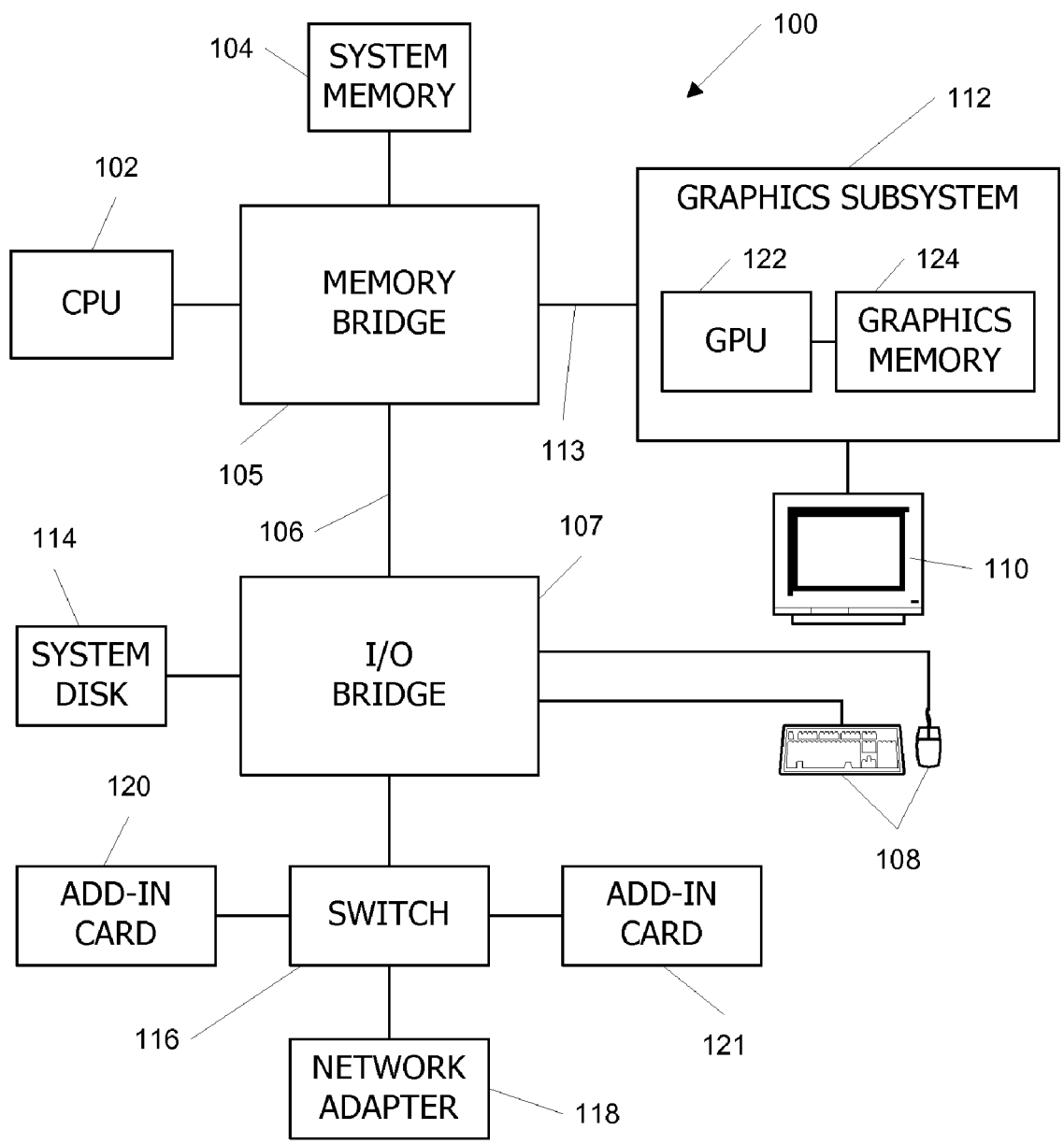
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a conventional Northbridge chip, is connected via a bus or other communication path 106 (e.g., a HyperTransport link) to an I/O (input/output) bridge 107. I/O bridge 107, which may be, e.g., a conventional Southbridge chip, receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus or other communication path 113, e.g., a PCI Express (PCI-E) or Accelerated Graphics Port (AGP) link. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI-E, AGP, HyperTransport, or any other bus or point-to-point communication protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Rendering Pipeline Overview

Figure 2:
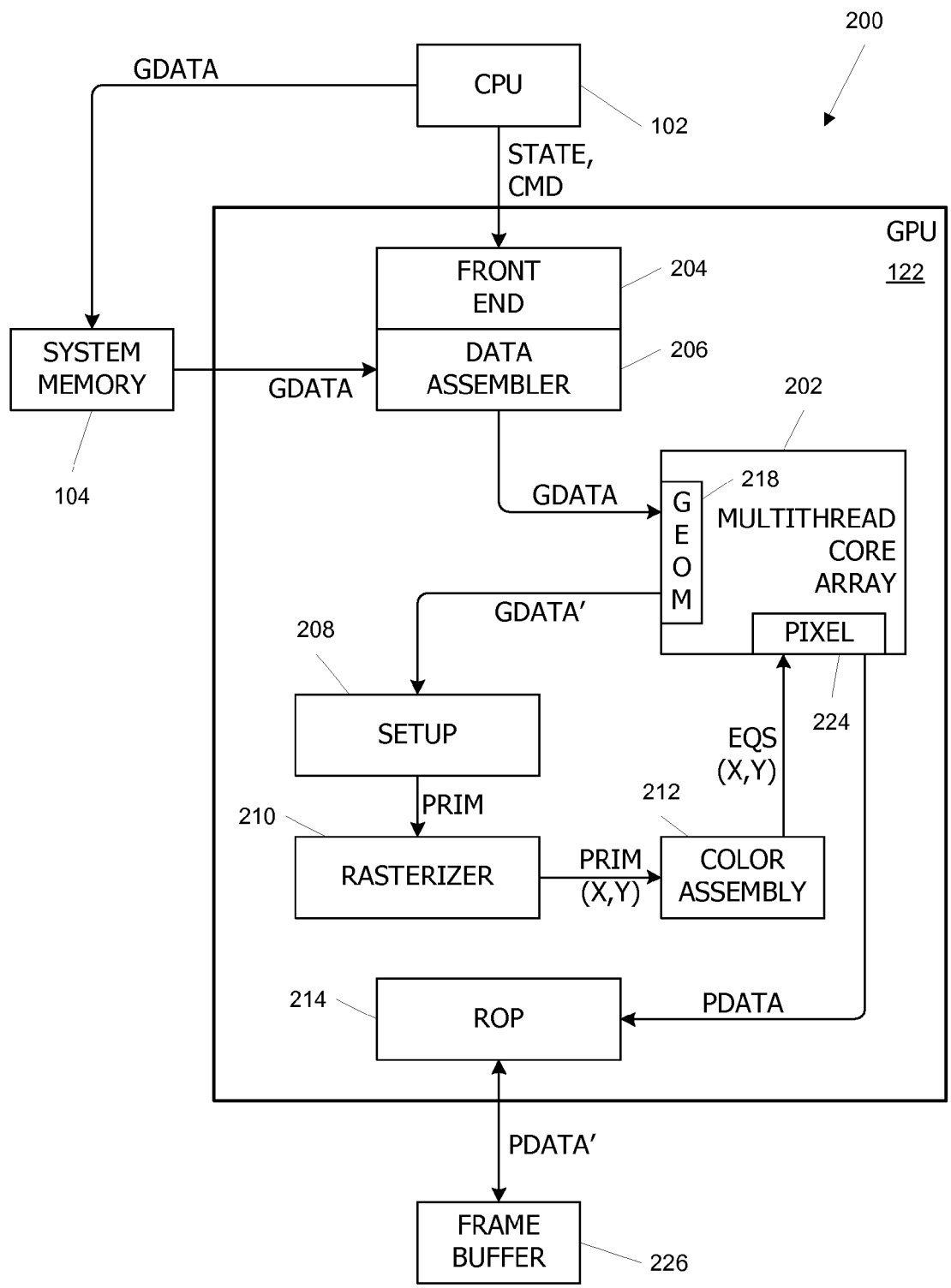
FIG. 2 is a block diagram of a rendering pipeline that can be implemented in a GPU shown in FIG. 1 according to an embodiment of the present invention.

FIG. 2 is a block diagram of a rendering pipeline 200 that can be implemented in GPU 122 of FIG. 1 according to an embodiment of the present invention. In this embodiment, rendering pipeline 200 is implemented using an architecture in which any applicable vertex shader programs, geometry shader programs, and pixel shader programs are executed using the same parallel-processing hardware, referred to herein as a "multithreaded core array" 202. Multithreaded core array 202 is described further below.

In addition to multithreaded core array 202, rendering pipeline 200 includes a front end 204 and data assembler 206, a setup module 208, a rasterizer 210, a color assembly module 212, and a raster operations module (ROP) 214, each of which can be implemented using conventional integrated circuit technologies or other technologies.

Front end 204 receives state information (STATE), rendering commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. The state information, rendering commands, and geometry data may be of a generally conventional nature and may be used to define the desired rendered image or images, including geometry, lighting, shading, texture, motion, and/or camera parameters for a scene.

In one embodiment, the geometry data includes a number of object definitions for objects (e.g., a table, a chair, a person or animal) that may be present in the scene. Objects are advantageously modeled as groups of primitives (e.g., points, lines, triangles and/or other polygons) that are defined by reference to their vertices. For each vertex, a position is specified in an object coordinate system, representing the position of the vertex relative to the object being modeled. In addition to a position, each vertex may have various other attributes associated with it. In general, attributes of a vertex may include any property that is specified on a per-vertex basis; for instance, in some embodiments, the vertex attributes include scalar or vector attributes used to determine qualities such as the color, texture, transparency, lighting, shading, and animation of the vertex and its associated geometric primitives.

Primitives, as already noted, are generally defined by reference to their vertices, and a single vertex can be included in any number of primitives. In some embodiments, each vertex is assigned an index (which may be any unique identifier), and a primitive is defined by providing an ordered list of indices for the vertices making up that primitive. Other techniques for defining primitives (including conventional techniques such as triangle strips or fans) may also be used.

The state information and rendering commands define processing parameters and actions for various stages of rendering pipeline 200. Front end 204 directs the state information and rendering commands via a control path (not explicitly shown)

to other components of rendering pipeline 200. As is known in the art, these components may respond to received state information by storing or updating values in various control registers that are accessed during processing and may respond to rendering commands by processing data received in the pipeline.

Front end 204 directs the geometry data to data assembler 206. Data assembler 206 formats the geometry data and prepares it for delivery to a geometry module 218 in multithreaded core array 202.

Geometry module 218 directs programmable processing engines (not explicitly shown) in multithreaded core array 202 to execute vertex and/or geometry shader programs on the vertex data, with the programs being selected in response to the state information provided by front end 204. The vertex and/or geometry shader programs can be specified by the rendering application as is known in the art, and different shader programs can be applied to different vertices and/or primitives. The shader program(s) to be used can be stored in system memory or graphics memory and identified to multithreaded core array 202 via suitable rendering commands and state information as is known in the art. In some embodiments, vertex shader and/or geometry shader programs can be executed in multiple passes, with different processing operations being performed during each pass. Each vertex and/or geometry shader program determines the number of passes and the operations to be performed during each pass. Vertex and/or geometry shader programs can implement algorithms using a wide range of mathematical and logical operations on vertices and other data, and the programs can include conditional or branching execution paths and direct and indirect memory accesses.

Vertex shader programs and geometry shader programs can be used to implement a variety of visual effects, including lighting and shading effects. For instance, in a simple embodiment, a vertex program transforms a vertex from its 3D object coordinate system to a 3D clip space or world space coordinate system. This transformation defines the relative positions of different objects in the scene. In one embodiment, the transformation can be programmed by including, in the rendering commands and/or data defining each object, a transformation matrix for converting from the object coordinate system of that object to clip space coordinates. The vertex shader program applies this transformation matrix to each vertex of the primitives making up an object. More complex vertex shader programs can be used to implement a variety of visual effects, including lighting and shading, procedural geometry, and animation operations. Numerous examples of such per-vertex operations are known in the art, and a detailed description is omitted as not being critical to understanding the present invention.

Geometry shader programs differ from vertex shader programs in that geometry shader programs operate on primitives (groups of vertices) rather than individual vertices. Thus, in some instances, a geometry program may create new vertices and/or remove vertices or primitives from the set of objects being processed. In some embodiments, passes through a vertex shader program and a geometry shader program can be alternated to process the geometry data.

In some embodiments, vertex shader programs and geometry shader programs are executed using the same programmable processing engines in multithreaded core array 202. Thus, at certain times, a given processing engine may operate as a vertex shader, receiving and executing vertex program instructions, and at other times the same processing engine may operates as a geometry shader, receiving and executing geometry program instructions. The processing engines can be multithreaded, and different threads executing different types of shader programs may be in flight concurrently in multithreaded core array 202.

After the vertex and/or geometry shader programs have executed, geometry module 218 passes the processed geometry data (GDATA') to setup module 208. Setup module 208, which may be of generally conventional design, generates edge equations from the clip space or screen space coordinates of each primitive; the edge equations are advantageously usable to determine whether a point in screen space is inside or outside the primitive.

Setup module 208 provides each primitive (PRIM) to rasterizer 210. Rasterizer 210, which may be of generally conventional design, determines which (if any) pixels are covered by the primitive, e.g., using conventional scan-conversion algorithms. As used herein, a "pixel" (or "fragment") refers generally to a region in 2-D screen space for which a single color value is to be determined; the number and arrangement of pixels can be a configurable parameter of rendering pipeline 200 and might or might not be correlated with the screen resolution of a particular display device. As is known in the art, pixel color may be sampled at multiple locations within the pixel (e.g., using conventional supersampling or multisampling techniques), and in some embodiments, supersampling or multisampling is handled within the pixel shader.

After determining which pixels are covered by a primitive, rasterizer 210 provides the primitive (PRIM), along with a list of screen coordinates (X,Y) of the pixels covered by the primitive, to a color assembly module 212. Color assembly module 212 associates the primitives and coverage information received from rasterizer 210 with attributes (e.g., color components, texture coordinates, surface normals) of the vertices of the primitive and generates plane equations (or other suitable equations) defining some or all of the attributes as a function of position in screen coordinate space.

These attribute equations are advantageously usable in a pixel shader program to interpolate a value for the attribute at any location within the primitive; conventional techniques can be used to generate the equations. For instance, in one embodiment, color assembly module 212 generates coefficients A, B, and C for a plane equation of the form $U=Ax+By+C$ for each attribute U.

Color assembly module 212 provides the attribute equations (EQS, which may include e.g., the plane-equation coefficients A, B and C for each primitive that covers at least one pixel and a list of screen coordinates (X,Y) of the covered pixels to a pixel module 224 in multithreaded core array 202. Pixel module 224 directs programmable processing engines (not explicitly shown) in multithreaded core array 202 to execute one or more pixel shader programs on each pixel covered by the primitive, with the program(s) being selected in response to the state information provided by front end 204. As with vertex shader programs and geometry shader programs, rendering applications can specify the pixel shader program to be used for any given set of pixels. Pixel shader programs can be used to implement a variety of visual effects, including lighting and shading effects, reflections, texture blending, procedural texture generation, and so on. Numerous examples of such per-pixel operations are known in the art and a detailed description is omitted as not being critical to understanding the present invention. Pixel shader programs can implement algorithms using a wide range of mathematical and logical operations on pixels and other data, and the programs can include conditional or branching execution paths and direct and indirect memory accesses.

Pixel shader programs are advantageously executed in multithreaded core array 202 using the same programmable processing engines that also execute the vertex and/or geometry shader programs. Thus, at certain times, a given processing engine may operate as a vertex shader, receiving and executing vertex program instructions; at other times the same processing engine may operates as a geometry shader, receiving and executing geometry program instructions; and at still other times the same processing engine may operate as a pixel shader, receiving and executing pixel shader program instructions. It will be appreciated that the multithreaded core array can provide natural load-balancing: where the application is geometry intensive (e.g., many small primitives), a larger fraction of the processing cycles in multithreaded core array 202 will tend to be devoted to vertex and/or geometry shaders, and where the application is pixel intensive (e.g., fewer and larger primitives shaded using complex pixel shader programs with multiple textures and the like), a larger fraction of the processing cycles will tend to be devoted to pixel shaders.

Once processing for a pixel or group of pixels is complete, pixel module 224 provides the processed pixels (PDATA) to ROP 214. ROP 214, which may be of generally conventional design, integrates the pixel values received from pixel module 224 with pixels of the image under construction in frame buffer 226, which may be located, e.g., in graphics memory 124. In some embodiments, ROP 214 can mask pixels or blend new pixels with pixels previously written to the rendered image. Depth buffers, alpha buffers, and stencil buffers can also be used to determine the contribution (if any) of each incoming pixel to the rendered image. Pixel data PDATA' corresponding to the appropriate combination of each incoming pixel value and any previously stored pixel value is written back to frame buffer 226. Once the image is complete, frame buffer 226 can be scanned out to a display device and/or subjected to further processing.

It will be appreciated that the rendering pipeline described herein is illustrative and that variations and modifications are possible. The pipeline may include different units from those shown and the sequence of processing events may be varied from that described herein. For instance, in some embodiments, rasterization may be performed in stages, with a "coarse" rasterizer that processes the entire screen in blocks (e.g., 16×16 pixels) to determine which, if any, blocks the triangle covers (or partially covers), followed by a "fine" rasterizer that processes the individual pixels within any block that is determined to be at least partially covered. In one such embodiment, the fine rasterizer is contained within pixel module 224. In another embodiment, some operations conventionally performed by a ROP may be performed within pixel module 224 before the pixel data is forwarded to ROP 214.

Further, multiple instances of some or all of the modules described herein may be operated in parallel. In one such embodiment, multithreaded core array 202 includes two or more geometry modules 218 and an equal number of pixel modules 224 that operate in parallel. Each geometry module and pixel module jointly control a different subset of the processing engines in multithreaded core array 202.

Multithreaded Core Array Configuration

Figure 3:
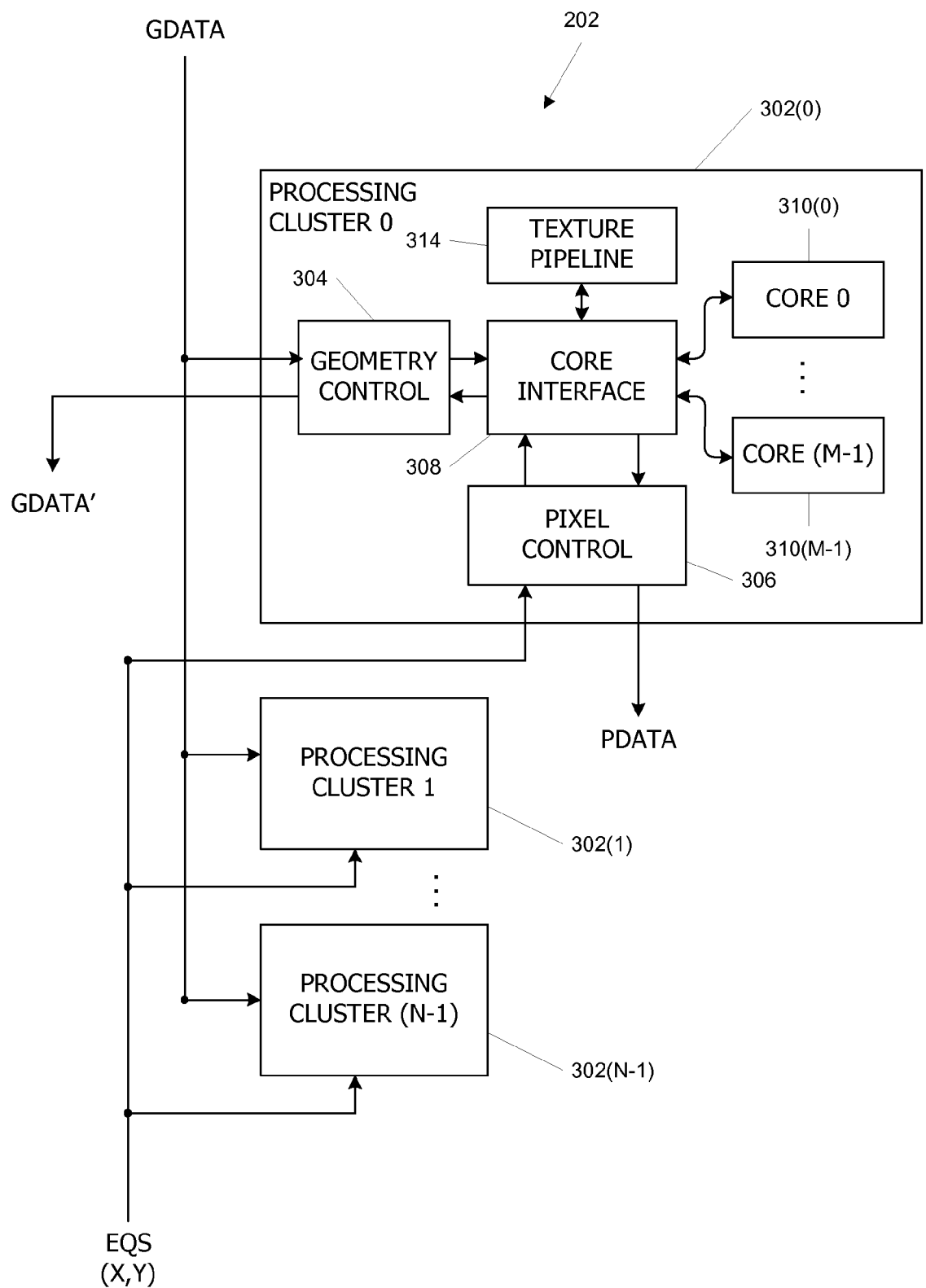
FIG. 3 is a block diagram of multithreaded core array according to an embodiment of the present invention.

In one embodiment, multithreaded core array 202 provides a highly parallel architecture that supports concurrent execution of a large number of instances of vertex, geometry, and/or pixel shader programs in various combinations. FIG. 3 is a block diagram of multithreaded core array 202 according to an embodiment of the present invention.

In this embodiment, multithreaded core array 202 includes some number (N) of processing clusters 302. Herein, multiple instances of like objects are denoted with reference numbers identifying the object and parenthetical numbers identifying the instance where needed. Any number N (e.g., 1, 4, 8, or any other number) of processing clusters may be provided. In FIG. 3, one processing cluster 302 is shown in detail; it is to be understood that other processing clusters 302 can be of similar or identical design.

Each processing cluster 302 includes a geometry controller 304 (implementing geometry module 218 of FIG. 2) and a pixel controller 306 (implementing pixel module 224 of FIG. 2). Geometry controller 304 and pixel controller 306 each communicate with a core interface 308. Core interface 308 controls a number (A) of cores 310 that include the processing engines of multithreaded core array 202. Any number M (e.g., 1, 2, 4 or any other number) of cores 310 may be connected to a single core interface. Each core 310 is advantageously implemented as a multithreaded execution core capable of supporting a large number (e.g., 100 or more) of concurrent execution threads (where the term "thread" refers to an instance of a particular program executing on a particular set of input data), including a combination of vertex threads, geometry threads, and pixel threads. An example architecture for a representative core 310 is described below with reference to FIG. 4.

Core interface 308 also controls a texture pipeline 314 that is shared among cores 310. Texture pipeline 314, which may be of generally conventional design, advantageously includes logic circuits configured to receive texture coordinates, to fetch texture data corresponding to the texture coordinates from memory, and to filter the texture data according to various algorithms. Conventional filtering algorithms including bilinear and trilinear filtering may be used. When a core 310 encounters a texture instruction in one of its threads, it provides the texture coordinates to texture pipeline 314 via core interface 308. Texture pipeline 314 processes the texture instruction and returns the result to the core 310 via core interface 308. Texture processing by pipeline 314 may consume a significant number of clock cycles, and while a thread is waiting for the texture result, core 310 advantageously continues to execute other threads.

In operation, data assembler 206 (FIG. 2) provides geometry data GDATA to processing clusters 302. In one embodiment, data assembler 206 divides the incoming stream of geometry data into portions and selects, e.g., based on availability of execution resources, which of processing clusters 302 is to receive the next portion of the geometry data. That portion is delivered to geometry controller 304 in the selected processing cluster 302.

Geometry controller 304 forwards the received data to core interface 308, which loads the vertex data into a core 310, then instructs core 310 to launch the appropriate vertex shader program. Upon completion of the vertex shader program, core interface 308 signals geometry controller 304. If a geometry shader program is to be executed, geometry controller 304 instructs core interface 308 to launch the geometry shader program. In some embodiments, the processed vertex data is returned to geometry controller 304 upon completion of the vertex shader program, and geometry controller 304 instructs core interface 308 to reload the data before executing the geometry shader program. After completion of the vertex shader program and/or geometry shader program, geometry controller 304 provides the processed geometry data (GDATA') to setup module 208 of FIG. 2.

At the pixel stage, color assembly module 212 (FIG. 2) provides attribute equations EQS for a primitive and pixel coordinates (X,Y) of pixels covered by the primitive to processing clusters 302. In one embodiment, color assembly module 212 divides the incoming stream of coverage data into portions and selects, e.g., based on availability of execution resources or the location of the primitive in screen coordinates, which of processing clusters 302 is to receive the next portion of the data. That portion is delivered to pixel controller 306 in the selected processing cluster 302.

Pixel controller 306 delivers the data to core interface 308, which loads the pixel data into a core 310, then instructs the core 310 to launch the pixel shader program. Where core 310 is multithreaded, pixel shader programs, geometry shader programs, and vertex shader programs can all be executed concurrently in the same core 310. Upon completion of the pixel shader program, core interface 308 delivers the processed pixel data to pixel controller 306, which forwards the pixel data PDATA to ROP unit 214 (FIG. 2).

It will be appreciated that the multithreaded core array described herein is illustrative and that variations and modifications are possible. Any number of processing clusters may be provided, and each processing cluster may include any number of cores. In some embodiments, shaders of certain types may be restricted to executing in certain processing clusters or in certain cores; for instance, geometry shaders might be restricted to executing in core 310(0) of each processing cluster. Such design choices may be driven by considerations of hardware size and complexity versus performance, as is known in the art. A shared texture pipeline is also optional; in some embodiments, each core might have its own texture pipeline or might leverage general-purpose functional units to perform texture computations.

Data to be processed can be distributed to the processing clusters in various ways. In one embodiment, the data assembler (or other source of geometry data) and color assembly module (or other source of pixel-shader input data) receive information indicating the availability of processing clusters or individual cores to handle additional threads of various types and select a destination processing cluster or core for each thread. In another embodiment, input data is forwarded from one processing cluster to the next until a processing cluster with capacity to process the data accepts it. In still another embodiment, processing clusters are selected based on properties of the input data, such as the screen coordinates of pixels to be processed.

The multithreaded core array can also be leveraged to perform general-purpose computations that might or might not be related to rendering images. In one embodiment, any computation that can be expressed in a data-parallel decomposition can be handled by the multithreaded core array as an array of threads executing in a single core. Results of such computations can be written to the frame buffer and read back into system memory.

Core Architecture

Figure 4:
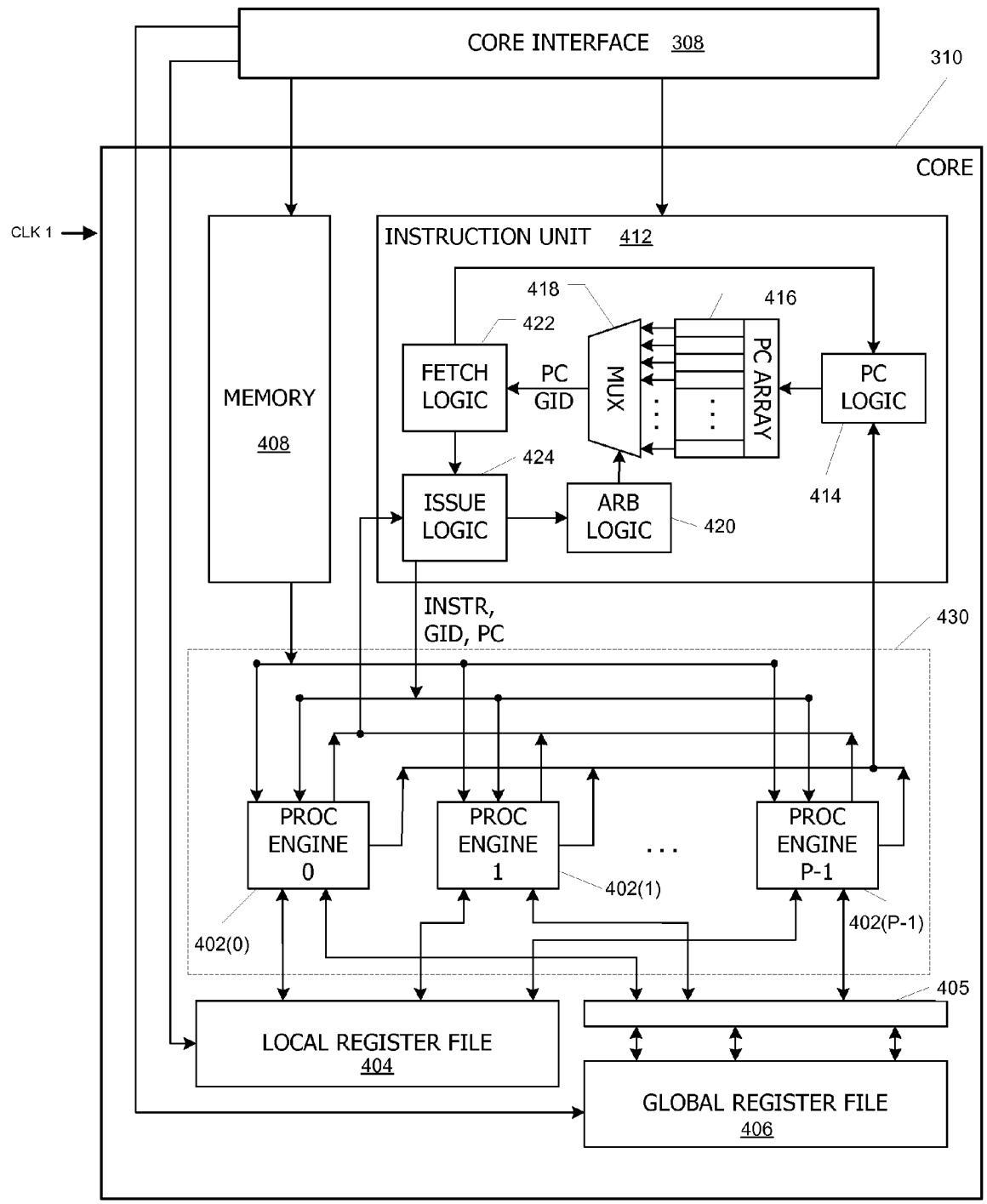
FIG. 4 is a block diagram of a core according to an embodiment of the present invention.

FIG. 4 is a block diagram of a core 310 according to an embodiment of the present invention. Core 310 is advantageously configured to execute a large number of threads in parallel, where the term "thread" refers to an instance of a particular program executing on a particular set of input data. For example, a thread can be an instance of a vertex shader program executing on the attributes of a single vertex or a pixel shader program executing on a given primitive and pixel. In some embodiments, single-instruction, multiple-data (SIMD) instruction issue techniques are used to support parallel execution of a large number of threads without providing multiple independent instruction fetch units. As shown in FIG. 4, core 310 generally operates based on a clock CLK 1. That is, components discussed below as being within core 310, including memory, an instruction unit, processing engines, and registers, may perform operations using CLK 1 as a source of timing.

In one embodiment, core 310 includes an array of P (e.g., 16) parallel processing engines 402 configured to receive SIMD instructions from a single instruction unit 412. The P processing engines 402 are located in a section 430 of core 310. Each parallel processing engine 402 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 402 is allocated space in a local register file 404 for storing its local input data, intermediate results, and the like. In one embodiment, local register file 404 is physically or logically divided into P lanes, each having some number of entries (where each entry might be, e.g., a 32-bit word). One lane is allocated to each processing engine, and corresponding entries in different lanes can be populated with data for corresponding thread types to facilitate SIMD execution. The number of entries in local register file 404 is advantageously large enough to support multiple concurrent threads per processing engine 402.

Each processing engine 402 also has access, via a crossbar switch 405, to a global register file 406 that is shared among all of the processing engines 402 in core 310. Global register file 406 may be as large as desired, and in some embodiments, any processing engine 402 can read to or write from any location in global register file 406. In addition to global register file 406, some embodiments also provide an on-chip shared memory 408, which may be implemented, e.g., as a conventional RAM. On-chip memory 408 is advantageously used to store data that is expected to be used in multiple threads, such as coefficients of attribute equations, which are usable in pixel shader programs. In some embodiments, processing engines 402 may also have access to additional off-chip shared memory (not shown), which might be located, e.g., within graphics memory 124 of FIG. 1.

In one embodiment, each processing engine 402 is multithreaded and can execute up to some number G (e.g., 32) of threads concurrently, e.g., by maintaining current state information associated with each thread in a different portion of its allocated lane in local register file 406. Processing engines 402 are advantageously designed to switch rapidly from one thread to another so that, for instance, a program instruction from a vertex thread could be issued on one clock cycle, followed by a program instruction from a different vertex thread or from a different type of thread such as a geometry thread or a pixel thread, and so on.

Instruction unit 412 is configured such that, for any given processing cycle, the same instruction (INSTR) is issued to all P processing engines 402. Thus, at the level of a single clock cycle, core 310 implements a P-way SIMD microarchitecture. Since each processing engine 402 is also multithreaded, supporting up to G threads, core 310 in this embodiment can have up to P*G threads in flight concurrently. For instance, if P=16 and G=32, then core 310 supports up to 512 concurrent threads.

Because instruction unit 412 issues the same instruction to all P processing engines 402 in parallel, core 310 is advantageously used to process threads in "SIMD groups." As used herein, a "SIMD group" refers to a group of up to P threads of execution of the same program on different input data, with one thread of the group being assigned to each processing engine 402. For example, a SIMD group might consist of P vertices, each being processed using the same vertex shader program. (A SIMD group may include fewer than P threads, in which case some of processing engines 402 will be idle during cycles when that SIMD group is being processed.) Since each processing engine 402 can support up to G threads, it follows that up to G SIMD groups can be in flight in core 310 at any given time.

On each clock cycle, one instruction is issued to all P threads making up a selected one of the G SIMD groups. To indicate which thread is currently active, a "group index" (GID) for the associated thread may be included with the instruction. Processing engine 402 uses group index GID as a context identifier, e.g., to determine which portion of its allocated lane in local register file 404 should be used when executing the instruction. Thus, in a given cycle, all processing engines 402 in core 310 are nominally executing the same instruction for different threads in the same group. In some embodiments, an active mask is applied at instruction issue to control which processing engines 402 execute the instruction so that an instruction can be executed in parallel for a subset of the threads in the SIMD group.

Instruction unit 412 includes program counter (PC) logic 414, a program counter register array 416, a multiplexer 418, arbitration logic 420, fetch logic 422, and issue logic 424. Program counter register array 416 stores G program counter values (one per SIMD group), which are updated independently of each other by PC logic 414. PC logic 414 updates the PC values based on information received from processing engines 402 and/or fetch logic 422. PC logic 414 is advantageously configured to track divergence among threads in a SIMD group and to select instructions in a way that ultimately results in the threads resynchronizing.

Fetch logic 422, which may be of generally conventional design, is configured to fetch an instruction corresponding to a program counter value PC from an instruction store (not shown) and to provide the fetched instructions to issue logic 424. In some embodiments, fetch logic 422 (or issue logic 424) may also include decoding logic that converts the instructions into a format recognizable by processing engines 402.

Arbitration logic 420 and multiplexer 418 determine the order in which instructions are fetched. More specifically, on each clock cycle, arbitration logic 420 selects one of the G possible group indices GID as the SIMD group for which a next instruction should be fetched and supplies a corresponding control signal to multiplexer 418, which selects the corresponding PC. Arbitration logic 420 may include conventional logic for prioritizing and selecting among concurrent threads (e.g., using round-robin, least-recently serviced, or the like), and selection may be based in part on feedback information from fetch logic 422 or issue logic 424 as to how many instructions have been fetched but not yet issued for each SIMD group.

Fetch logic 422 provides the fetched instructions, together with the group index GID and program counter value PC, to issue logic 424. In some embodiments, issue logic 424 maintains a queue of fetched instructions for each in-flight SIMD group. Issue logic 424, which may be of generally conventional design, receives status information from processing engines 402 indicating which SIMD groups are ready to execute a next instruction. Based on this information, issue logic 424 selects a next instruction to issue and issues the selected instruction, together with the associated PC value and GID. Each processing engine 402 either executes or ignores the instruction, depending on an active mask associated with the group index GID. In one embodiment, the active mask reflects the presence or absence of idle threads in the SIMD group and/or divergence in the execution paths taken by different threads in the SIMD group.

In one embodiment, instructions within a SIMD group are issued in order relative to each other, but the next instruction to be issued can be associated with any one of the SIMD groups. For instance, if in the context of one SIMD group, one or more processing engines 402 are waiting for a response from other system components (e.g., off-chip memory or texture pipeline 314 of FIG. 3), issue logic 424 advantageously selects a group index GID corresponding to a different SIMD group.

For optimal performance, all threads within a SIMD group are advantageously launched on the same clock cycle so that they begin in a synchronized state. In one embodiment, core interface 308 advantageously loads a SIMD group into core 310, then instructs core 310 to launch the group. "Loading" a group includes supplying instruction unit 412 and processing engines 402 with input data and other parameters required to execute the applicable program. For example, in the case of vertex processing, core interface 308 loads the starting PC value for the vertex shader program into a slot in PC array 416 that is not currently in use; this slot corresponds to the group index GID assigned to the new SIMD group that will process vertex threads. Core interface 308 allocates sufficient space for an input buffer (e.g., in global register file 406 or local register file 404) for each processing engine 402 to execute one vertex thread, then loads the vertex data. In one embodiment, all data for the first vertex in the group is loaded into a lane of the input buffer allocated to processing engine 402(0), all data for the second vertex is in a lane of the input buffer allocated to processing engine 402(1), and so on. In some embodiments, data for multiple vertices in the group can be loaded in parallel.

Once all the data for the group has been loaded, core interface 308 launches the SIMD group by signaling to instruction unit 412 to begin fetching and issuing instructions corresponding to the group index GID of the new group. SIMD groups for geometry and pixel threads can be loaded and launched in a similar fashion.

It should be noted that although all threads within a group are executing the same program and are initially synchronized with each other, the execution paths of different threads in the group might diverge during the course of program execution. Instruction unit 412 advantageously manages instruction fetch and issue for each SIMD group so as to ensure that threads in a group that have diverged eventually resynchronize. For instance, in one embodiment, instruction unit 412 maintains a branch token stack for each SIMD group. If a branch is taken by some threads in a SIMD group ("taken threads") but not by others ("not-taken threads"), a token is pushed onto the SIMD group's branch token stack. The token includes a mask identifying the not-taken threads. Instruction unit 412 continues to fetch instructions for the taken threads; these instructions are issued to all processing engines 402 with an active mask set such that the instructions are executed for the taken threads but not for the not-taken threads. Execution of the taken threads continues until a point in the instruction stream at which the branch-taken path and the branch-not-taken path merge. The merge point can be identified, e.g., by a flag or other indicator associated with the instruction where the merge occurs.

Once the merge point is reached, instruction unit 412 pops the token off the branch token stack and begins fetching instructions for the not-taken threads; these instructions are issued to all processing engines 402 with the active mask set such that the instructions are executed for not-taken threads but not for taken threads. Execution of the not-taken threads continues until the merge point is reached. Thereafter, the taken and not-taken active masks are merged into a single active mask, and fetching and executing continues.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired.

In one alternative embodiment, SIMD groups containing more than P threads ("supergroups") can be defined. A supergroup is defined by associating the group index values of two (or more) of the SIMD groups (e.g., GID1 and GID2) with each other. When issue logic 424 selects a supergroup, it issues the same instruction twice on two successive cycles: on one cycle, the instruction is issued for GID1, and on the next cycle, the same instruction is issued for GID2. Thus, the supergroup is in effect a SIMD group. Supergroups can be used to reduce the number of distinct program counters, state definitions, and other per-group parameters that need to be maintained without reducing the number of concurrent threads.

Reduced Number of Processing Engines Operated at Increased Clock Rate

Figure 5:
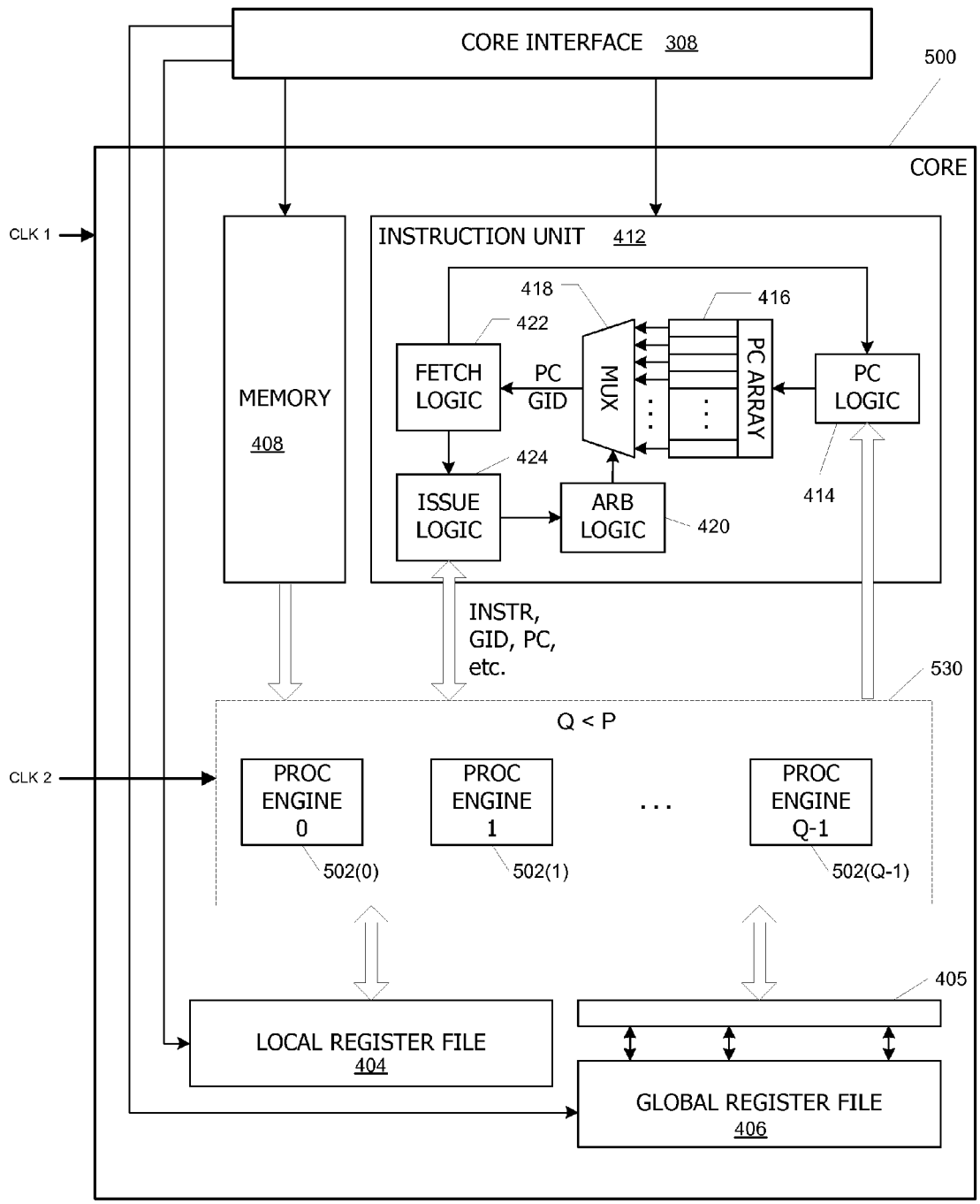
FIG. 5 is a block diagram of a core which utilizes a reduced number of processing engines operated at in increased clock rate, according to an embodiment of the present invention.

FIG. 5 is a block diagram of a core 500 which utilizes a reduced number of processing engines operated at in increased clock rate, according to an embodiment of the present invention. Core 500 operates in a manner as similar to core 310 shown in FIG. 4. However, core 510 utilizes Q processing engines 502, as opposed to P processing engines 402. Q is a number smaller than P. The Q processing engines 502 are located in a section 530 of core 500. The design of core 502 may be substantially the same as core 310 shown in FIG. 4, except for the contents of section 530. In FIG. 5, signals going to and from section 530 have been simplified to ease illustration.

According to the present embodiment of the invention, the Q processing engines 502 are operated using a faster clock than the rest of core 500. As shown in FIG. 5, core 500 generally operates based on a clock CLK 1. That is, components such as memory 408, instruction unit 412, local register file 404, crossbar switch 405, and global register file 406 may perform operations using CLK 1 as a source of timing. However, the Q processing engines 502 operate based on a faster clock CLK 2.

This increased speed allows the Q processing engines 502 to carry out as many executions of instructions as P processing engines 402. Thus, the rest of core 500 may be able to treat the Q processing engines 502 as if they actually comprised of P processing engines 402. For example, instruction unit 412 in FIG. 5 may still issue an instruction for P executions of the instruction using different data—i.e., for P threads of a "SIMD" group. Instead of P processing engines each operating on one of the P executions as in the case of core 310, now Q processing engines operate to achieve the P executions of the instruction in core 500.

The use of a reduced number of processing engines operated at in increased clock rate makes it possible to decrease the circuit area consumption associated with implementations of a core. Each processing engine may comprise one or more execution units that perform various instructions and may require significant amounts of logic. In an semiconductor implementation, this translates to a substantial portion of precious semiconductor area. By reducing the number of processing engines and running them at a higher clock rate, the amount of circuit area consumed can be effectively reduced. Of course, increasing the clock rate of each processing engine may involve an overhead of additional logic. However, such overhead can be outweighed by the savings in circuit area consumption achieved by reducing the number of processing units from P to Q.

Figure 6A:
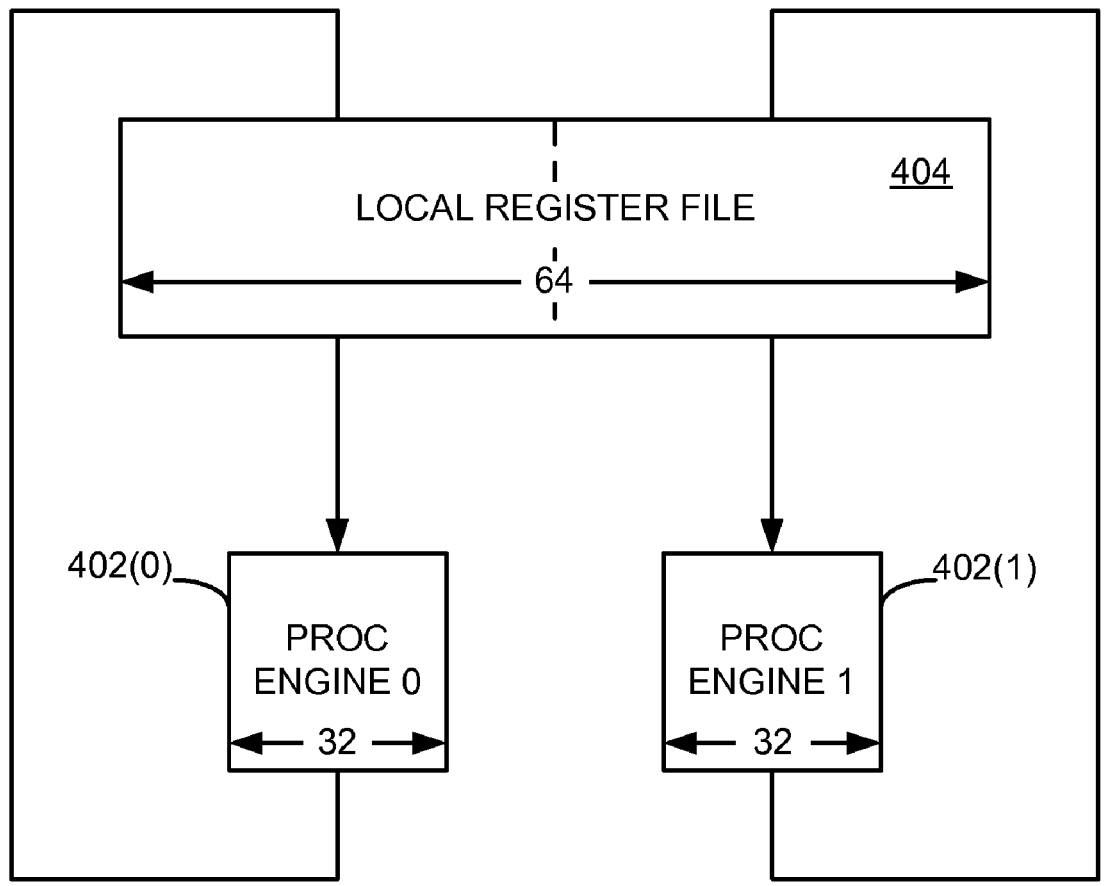
FIG. 6A presents an implementation of two of the P processing engines in a core as shown in FIG. 4.
Figure 6B:
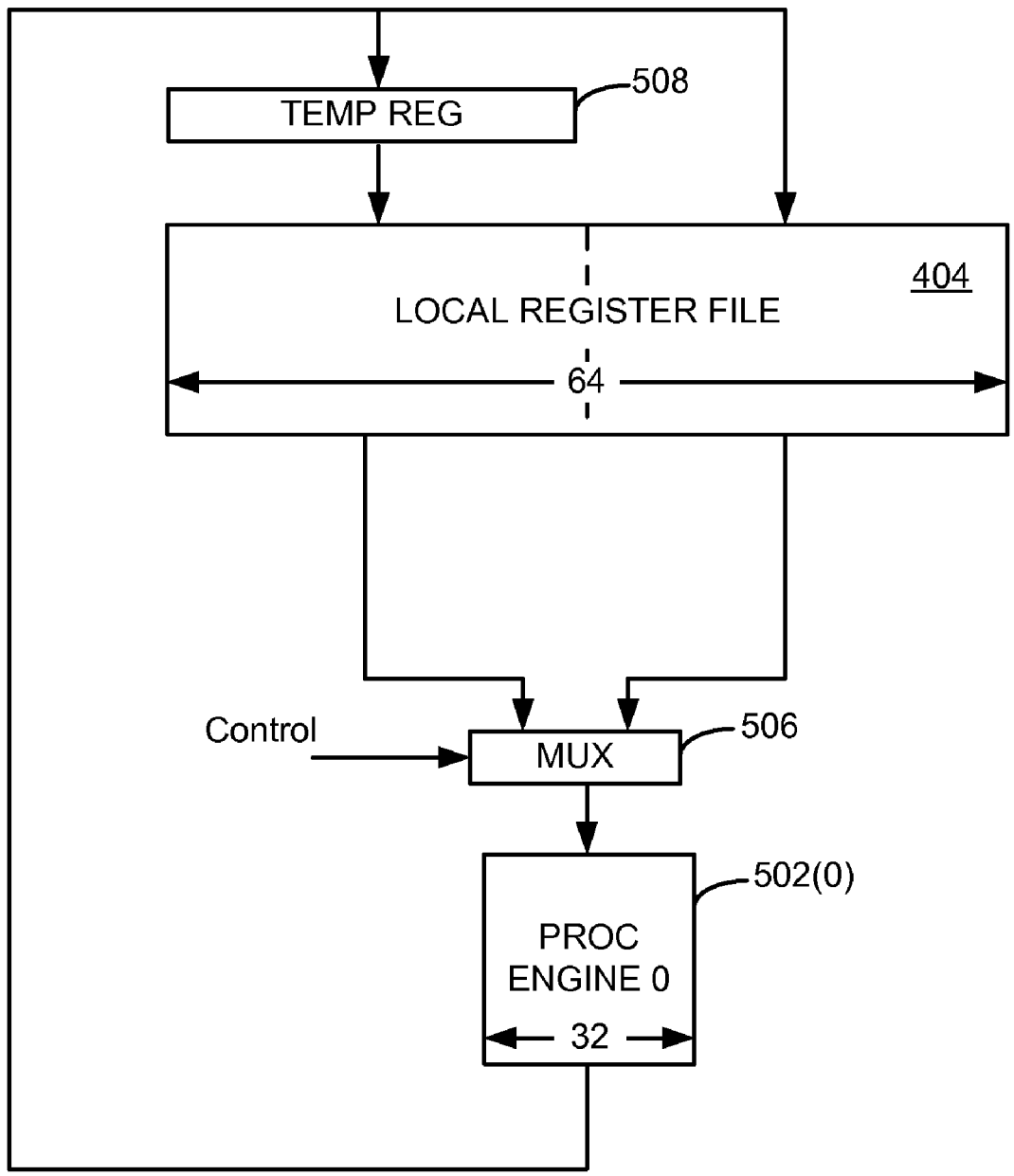
FIG. 6B presents an implementation of one of the Q processing engines in core as shown in FIG. 5.

Different values of P and Q may be selected in various embodiments of the invention. According to one embodiment, P is selected as 16, and Q is selected as 8. The ratio of P/Q is equal to 2 in this case. Thus, every two processing engines 402 may be replaced with one processing engine 502. FIGS. 6A and 6B below illustrate the difference between an implementation of two of the P processing engines 402 versus an implementation of one of the Q processing engine 502 in such a context.

FIG. 6A presents an implementation of two of the P processing engines 402 in core 310 as shown in FIG. 4. These are processing engines 402(0) and 402(1). For easy of illustration, this figure only shows the flow of input data for each instruction into processing engines 402(0) and 402(1) and the flow of output data generated from each instruction out of processing engines 402(0) and 402(1). The input data is read from local register file 404, and the output data is written back to local register 404. Other signals such as INSTR, GID, PC, etc. are not explicitly shown.

Here, each of the processing engines 402(0) and 402(1) is 32-bits wide. That is, each processing engine is capable of executing an instruction on 32-bit wide input data and generate 32-bit output data. For instance, the data may be 32-bit fixed point data or 32-bit floating point data. For each processing engine, the input data for an instruction may comprise a set of one or more pieces of data, each 32-bit wide in this case. For example, the input data for an execution of an ADD instruction may comprise two 32-bit wide operands that are to be added together. For each processing engine, the output data for an instruction may also comprise a set of one or more pieces of data, each 32-bits wide in this case. In many cases, the output data comprises only one piece of data. For example, the output data for an execution of an ADD instruction may comprise a 32-bit wide result.

In the present embodiment, a 64-bit wide local register 404 may be viewed as having a left half and a right half, each 32-bits wide. The left half may be used to store input data and output data for processing engine 402(0). The right half may be used to store input data and output data for processing engine 402(1).

Clocking for the operation of local register 404 is based on CLK 1. This corresponds to the fact that instructions may be issued by instruction unit 412 at the rate of CLK 1. That is, one instruction may be issued for every cycle of CLK 1. Accordingly, input data for the instruction is read out of local register file 404 based on CLK 1. Such reading of local register file 404 may be implemented in various ways. One example is discussed below for purposes of illustration. In this example, in one cycle of CLK 1, all the input data required for an instruction by both processing engines 402(0) and 402(1) is read from local register 404. This may require only one read cycle of local register 404. Alternatively, depending on the capability of local register 404, this may be divided up into multiple read cycles of local register 404. To perform such multiple read cycles within one cycle of CLK 1, local register file 404 may be driven using a multiplied-up clock derived from CLK 1.

Clocking for the operation of processing engines 402(0) and 402(1) is also based on CLK 1. In this example, in one cycle of CLK 1, the input data read from local register file 404 for an instruction is separately loaded into processing engines 402(0) and 402(1). Here, processing engines 402(0) and 402 (1) are pipelined. Each pipeline may have a latency of multiple clock cycles. Thus, output data resulting from the execution of an instruction may not emerge from processing engines 402(0) and 402(1) until multiple cycles later. This does not stop the loading of input data for subsequent instructions into processing engines 402(0) and 402(1). In this manner, input data for a new instruction may be read from local register file 404 and loaded into processing engines 402(0) and 402(1) in each cycle of CLK 1. Also, output data for a completed instruction may emerge from processing engines 402(0) and 402(1) in each cycle of CLK 1. The emerged output data is written to appropriate locations in local register file 404.

Thus, processing engine 402(0) and 402(1) operate in parallel on separate sets of data. This provides for processing of two separate threads of execution. In other words, for each instruction issued, two separate executions of the instruction is performed. One execution is performed by processing engine 402(0) using one set of input data. Another execution is performed by processing engine 402(1) using anther set of input data. Pipelining may introduce multiple cycles of latency. Nevertheless, output data for two separate executions of an issued instruction may emerge for every cycle of CLK 1.

FIG. 6B presents an implementation of one of the Q processing engines 502 in core 500 as shown in FIG. 5. This is processing engine 502(0). As mentioned previously, one processing engine 502(0) shown in FIG. 6B may replace two processing engines 402(0) and 402(1) shown in FIG. 6A. For ease of illustration, this figure only shows the flow of input data for each instruction into processing engine 502(0) and the flow of output data generated from each instruction out of processing engine 502(0). The input data is read from local register file 404, and the output data is written back to local register 404—with the help of appropriate gating and switching logic. Other signals such as INSTR, GID, PC, etc. are not explicitly shown.

In the present embodiment of the invention, processing engine 502(0) is 32-bits wide. That is, the processing engine is capable of executing an instruction on 32-bit wide input data and generate 32-bit output data. For instance, the data may be 32-bit fixed point data or 32-bit floating point data. For this processing engine, the input data for an instruction may comprise a set of one or more pieces of data, each 32-bit wide in this case. For example, the input data for an execution of an ADD instruction may comprise two 32-bit wide operands that are to be added together. For this processing engine, the output data for an instruction may also comprise a set of one or more pieces of data, each 32-bits wide in this case. In many cases, the output data comprises only one piece of data. For example, the output data for an execution of an ADD instruction may comprise a 32-bit wide result.

A 64-bit wide local register 404 may be viewed as having a left half and a right half, each 32-bits wide. The left half may be used to store input data and output data for processing engine 502(0), for one execution of an instruction. The right half may be used to store input data and output data for processing engine 502(0), for another execution of the same instruction. These two executions of the instruction using different data is referred to below as the "L" execution and the "R" execution.

Here, instructions may be issued by instruction unit 412 at the rate of CLK 1. However, operation of processing engine 502(0) may be based on the rate of CLK 2, which may be twice (or another multiple of) the rate of CLK 1. A multiplexer 506 operated at the rate of CLK 2 suitably selects either the 32-bit left half or the 32-bit right half of the 64-bit local register 404 as input to processing engine 502(0). For instance, in one cycle of CLK 2, multiplexer 506 may select the 32-bit left half of local register 404 as input to processing engine 502(0). In the next cycle of CLK 2, multiplexer 506 may select the 32-bit right half of local register 404 as input to processing engine 502(0).

In the example shown in FIG. 6B, each write to local register 404 can only be performed 64-bits at a time, once per each cycle of CLK 1. Thus, a temporary register 508 is employed to temporarily store the 32-bit result produced in one cycle of CLK 2 by processing engine 502(0). When the 32-bit result produced in the next cycle of CLK 2 by processing engine 502(0) becomes available, the two 32-bit results can be written as a 64-bit value to local register 404. Such a write to local register 404 would be based on CLK 1.

In an alternative example, each write to local register 404 can be performed 32-bits at a time, once per each cycle of CLK 2. Here, temporary register 508 is no longer necessary. As processing engine 502(0) produces a 32-bit result on each cycle of CLK 2, the 32-bit result can be immediately written to local register 404. In such an implementation, FIG. 6B may be modified to remove temporary register 508.

Furthermore, there may be variations in the use of local register 404 as source and/or destination registers. For example, in one embodiment of the invention, the same local register 404 may serves as both the source and the destination register for processing engine 502(0). In this case, processing engine 502(0) obtains input data for an instruction from a local register 404 and returns resulting output data to the same local register 404. In another embodiment of the invention, different ones of local registers 404 may serve as source and destination registers. In that case, processing engine 502(0) obtains input data for an instruction from a local register 404 and returns resulting output data to a different local register 404.

Here, processing engine 502(0) is pipelined. The pipeline may have a latency of multiple clock cycles. Thus, output data resulting from a particular execution (either an "L" execution or an "R" execution) of an instruction may not emerge from processing engine 502(0) until multiple cycles later. This does not stop the loading of input data for new "L" executions and "R" executions into processing engine 502(0). In this manner, input data for an execution (either an "L" execution or an "R" execution) of an instruction may be read loaded into processing engine 502(0) in each cycle of CLK 2. Also, output data for a completed execution (either an "L" execution or an "R" execution) of an instruction may emerge from processing engine 502(0) in each cycle of CLK 2.

The emerged output data is written to appropriate locations in local register file 404, again with the help of gating logic. Here, 32-bit temporary register 508 is used. A 32-bit output data for the "L" execution of an instruction emerges in one cycle of CLK 2 and is written to temporary register 508. A 32-bit output data for the "R" execution of the same instruction emerges in the next cycle of CLK 2. At this point, output data for both the "L" execution and the "R" execution of this instruction are available and may be written together as a 64-bit wide data value to local register file 404. Such a write occurs once every two cycles of CLK 2, which is equivalent to every one cycle of CLK 1 in this case.

Thus, processing engine 502(0) operates at an increased clock rate (CLK 2) to achieve two executions of an instruction on separate sets of data. This provides for processing of two separate threads of execution. In other words, for each instruction issued, two separate executions of the instruction is performed. One execution is performed by processing engine 502(0) using one set of input data. Another execution is performed by same processing engine 502(0) using another set of input data. In one embodiment, the first execution immediately follows the second execution in the pipeline of processing engine 502(0). Pipelining may introduce multiple cycles of latency. Nevertheless, output data for two separate executions of an issued instruction may emerge for every two cycles of CLK 2, which is equivalent to every one cycle of CLK 1 in this case.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for performing instructions using multiple execution units in a graphics processing unit comprising:
    issuing an instruction for P executions of the instruction wherein each execution uses different data, P being a positive integer, the instruction being issued based on a first clock having a first clock rate;
    operating Q execution units to achieve the P executions of the instruction, Q being a positive integer less than P and greater than one, each of the execution units being operated based on a second clock having a second clock rate higher than the first clock rate of the first clock; and
    wherein the second clock rate of the second clock is equal to the first clock rate of the first clock multiplied by the ratio P/Q, and
    wherein if the multiple execution units comprises a total number of execution units greater than Q, an active device mask is used to identify a subset of Q execution units of the multiple execution units that are to be used to achieve the P executions of the instruction.

2. The method of claim 1 wherein at least one of the execution units comprises pipeline stages.

3. The method of claim 2 wherein in one cycle of the first clock, the at least one execution unit loads input data for a first one of the P executions into the pipeline stages followed by input data for a second one of the P executions.

4. The method of claim 2 wherein in one cycle of the first clock, the at least one execution unit produces output data for a first one of the P executions from the pipeline stages followed by output data for a second one of the P executions.

5. The method of claim 1 wherein the ratio of P/Q is equal to 2.

6. The method of claim 5 wherein input data for a first execution of the instruction is received by one of the Q processing engines in one cycle of the second clock, and input data for a second execution of the instruction is received by the same one of the Q processing engines in a consecutive cycle of the second clock.

7. The method of claim 5 wherein output data for a first execution of the instruction is produced by one of the Q processing engines in one cycle of the second clock, and output data for a second execution of the instruction is produced by the same one of the Q processing engines in a consecutive cycle of the second clock.

8. The method of claim 7 wherein the output data for the first execution of the instruction is temporarily stored in a register while awaiting the output data for the second execution of the instruction.

9. The method of claim 8 the output data for the first execution of the instruction and the output data for the second execution of the instruction are written to a register in a register file in one cycle of the first clock.

10. An apparatus for performing instructions using multiple execution units in a graphics processing unit comprising:
    an instruction issue unit capable of issuing an instruction for P executions of the instruction wherein each execution uses different data, P being a positive integer, the instruction unit capable of issuing the instruction based on a first clock having a first clock rate;
    Q execution units coupled to the instruction unit and capable of operating to achieve the P executions of the instruction, Q being a positive integer less than P and greater than one, each of the execution units being capable of operating based on a second clock having a second clock rate higher than the first clock rate of the first clock; and
    wherein the second clock rate of the second clock is equal to the first clock rate of the first clock multiplied by the ratio P/Q, and
    wherein if the multiple execution units comprises a total number of execution units greater than Q, an active device mask is used to identify a subset of Q execution units of the multiple execution units that are to be used to achieve the P executions of the instruction.

11. The apparatus of claim 10 wherein at least one of the execution units comprises pipeline stages.

12. The apparatus of claim 11 wherein in one cycle of the first clock, the at least one execution unit is capable of loading input data for a first one of the P executions into the pipeline stages followed by input data for a second one of the P executions.

13. The apparatus of claim 11 wherein in one cycle of the first clock, the at least one execution unit is capable of producing output data for a first one of the P executions from the pipeline stages followed by output data for a second one of the P executions.

14. The apparatus of claim 10 wherein the ratio of P/Q is equal to 2.

15. The apparatus of claim 14 wherein one of the Q processing engines is capable of receiving input data for a first execution of the instruction in one cycle of the second clock, and the same one of the Q processing engines is capable of receiving input data for a second execution of the instruction in a consecutive cycle of the second clock.

16. The apparatus of claim 14 wherein one of the Q processing engines is capable of producing output data for a first execution of the instruction in one cycle of the second clock, and the same one of the Q processing engines is capable of producing output data for a second execution of the instruction in a consecutive cycle of the second clock.

17. The apparatus of claim 16 further comprising a register capable of temporarily storing the output data for the first execution of the instruction while awaiting the output data for the second execution of the instruction.

18. The apparatus of claim 17 further comprising a register in a register file capable of receiving the output data for the first execution of the instruction and the output data for the second execution of the instruction in one cycle of the first clock.

19. A system for performing instructions using multiple execution units in a graphics processing unit comprising:

means for issuing an instruction for P executions of the instruction wherein each execution uses different data, P being a positive integer, the instruction being issued based on a first clock having a first clock rate;

means for operating Q execution units to achieve the P executions of the instruction, Q being a positive integer less than P and greater than one, each of the execution units being operated based on a second clock having a second clock rate higher than the first clock rate of the first clock; and wherein the second clock rate of the second clock is equal to the first clock rate of the first clock multiplied by the ratio P/Q, and wherein if the multiple execution units comprises a total number of execution units greater than Q, an active device mask is used to identify a subset of Q execution units of the multiple execution units that are to be used to achieve the P executions of the instruction.

* * * * *